(12) United States Patent
Zave

(10) Patent No.: US 9,232,054 B2
(45) Date of Patent: Jan. 5, 2016

(54) MID-CALL, MULTI-PARTY, AND MULTI-DEVICE TELECOMMUNICATION FEATURES AND THEIR INTERACTIONS

(75) Inventor: Pamela Zave, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1119 days.

(21) Appl. No.: 13/250,191

(22) Filed: Sep. 30, 2011

(65) Prior Publication Data

US 2013/0083912 A1 Apr. 4, 2013

(51) Int. Cl.
*H04M 3/42* (2006.01)
*H04M 3/428* (2006.01)
*H04M 3/56* (2006.01)
*H04M 3/58* (2006.01)

(52) U.S. Cl.
CPC ............ *H04M 3/4217* (2013.01); *H04M 3/428* (2013.01); *H04M 3/56* (2013.01); *H04M 3/58* (2013.01)

(58) Field of Classification Search
USPC ............................ 379/211.01, 211.02, 201.01
See application file for complete search history.

(56) References Cited

U.S. PATENT DOCUMENTS

| | | | |
|---|---|---|---|
| 6,160,883 A | 12/2000 | Jackson et al. | |
| 6,404,878 B1 | 6/2002 | Jackson et al. | |
| 6,560,326 B1 * | 5/2003 | Clark | 379/221.09 |
| 6,822,942 B1 | 11/2004 | Jackson et al. | |
| 6,826,275 B1 | 11/2004 | Jackson et al. | |
| 6,829,346 B1 | 12/2004 | Zave et al. | |
| 6,990,185 B1 | 1/2006 | Zave et al. | |
| 7,212,621 B1 * | 5/2007 | Wallenius et al. | 379/221.01 |
| 7,251,254 B2 | 7/2007 | Bond et al. | |
| 7,295,667 B1 | 11/2007 | Jackson et al. | |
| 7,386,108 B1 | 6/2008 | Zave et al. | |
| 7,469,046 B1 | 12/2008 | Jackson et al. | |
| 7,907,712 B2 | 3/2011 | Goguen et al. | |

OTHER PUBLICATIONS

Zave, Pamela, "Mid-Call, Multi-Party, and Multi-Device Telecommunication Features and Their Interactions," IPTComm 2011 Chicago, Illinois, Aug. 1-2, 2011.
Zave, Pamela, "Address Translation in Telecommunication Features," ACM Transactions on Software Engineering and Methodology, 2004.

(Continued)

*Primary Examiner* — Quynh Nguyen
(74) *Attorney, Agent, or Firm* — Hartman & Citrin LLC

(57) ABSTRACT

Mid-call features are implemented during a call placed over a communications network. The mid-call features are implemented through a set of call feature modules, each of which having been categorized in accordance with a feature implementation architecture. An exemplary method for routing requests within a feature server computer to set up a feature implementation includes receiving, at a per-incoming call feature module of a feature server computer, an initial incoming call request, routing the initial incoming call request from the per-incoming call feature module to a multi-call feature module of the feature server computer, routing the initial incoming call request from the multi-call feature module to an omniscient call feature module, routing the initial incoming call request from the omniscient call feature module to a multi-device call feature module, and routing the initial incoming call request from the multi-device call feature module to a per-outgoing device feature module.

20 Claims, 10 Drawing Sheets

(56) References Cited

OTHER PUBLICATIONS

Zave, Pamela, "Audio Feature Interactions in Voice-Over-IP," Proceedings of the First International Conference on Principles, Systems and Application of IP Telecommunications, ACM SIGCOMM, 2007.
Zave, Pamela, "Modularity in Distributed Feature Composition," Software Requirements and Design: The Work of Michael Jackson, Good Friends Publication, 2010.
Zave, P., et al., "Abstractions for Programming SIP Back-to-Back User Agents," Proceedings of the Third International Conference on Principles, Systems and Applications of IP Telecommunications. ACM SIGCOMM, 2009.
Zave, P., et al., "Compositional Control of IP Media," IEEE Transactions on Software Engineering, Jan./Feb. 2009.
Zave, P., et al., "The DFC Manual," Technical Report, AT&T Research, 2003. http://www2.research.att.com/~pamela/man.pdf.
3GPP. Service requirements for the IP multimedia core network subsystem. 3GPP Technical Specification 23.228 Stage 2. Jun. 2011.
G. Bruns. Foundations for features. In Feature Interactions in Telecommunications and Software Systems VIII, pp. 3-11, Amsterdam, 2005. IOS Press.
E. J. Cameron, N. D. Griffeth, Y.-J. Lin, M. E. Nilson, W. K. Schnure, and H. Velthuijsen. A feature-interaction benchmark for IN and beyond. IEEE Communications, 31(3):64-69, Mar. 1993.
E. Cheung and T. M. Smith. Experience with modularity in an advanced teleconferencing service deployment. In Proceedings of the Thirty-First International Conference on Software Engineering. IEEE, 2009.
E. Cheung and P. Zave. Generalized third-party call control in SIP networks. In Proceedings of the Second International Conference on Principles, Systems and Applications of IP Telecommunications, pp. 45-68. Springer-Verlag LNCS 5310, 2008.
M. Jackson and P. Zave. Distributed Feature Composition: A virtual architecture for telecommunications services. IEEE Transactions on Software Engineering, 24(10):831-847, Oct. 1998.
JSR 289: SIP Servlet API Version 1.1. Java Community Process Final Release, http://www.jcp.org/en/jsr/detail?id=289, 2008.
A. F. Layouni, L. Logrippo, and K. J. Turner. Conflict detection in call control using first-order logic model checking. In Feature Interactions in Telecommunications and Software Systems IX, pp. 66-82, Amsterdam, 2008. IOS Press.
X. Wu, J. Buford, K. Dhara, M. Kolberg, and V. Krishnaswamy. Feature interactions between Internet services and telecommunication services. In Proceedings of the Third International Conference on Principles, Systems and Applications of IP Telecommunications. ACM SIGCOMM, 2009.
X. Wu and H. Schulzrinne. Handling feature interactions in the Language for End System Services. In Feature Interactions in Telecommunications and Software Systems VIII, pp. 270-287, Amsterdam, 2005. IOS Press.
Y. Inoue, K. Takami, and T. Ohta. Method for supporting detection and elimination of feature interaction in a telecommunication system. In Proceedings of the International Workshop on Feature Interactions in Telecommunications Software Systems, pp. 61-81. IEEE Communications Society, 1992.

\* cited by examiner

MID-CALL, MULTI-PARTY, AND MULTI-DEVICE TELECOMMUNICATION FEATURES AND THEIR INTERACTIONS

BACKGROUND

This application relates generally to interactions among telecommunications features and, more particularly, to mid-call, multi-party, and multi-device telecommunication features and their interactions.

Many features are invoked when voice or multimedia calls are being set up. These call set-up features and their interactions are generally well-understood. Interactions among features that act only after an initial call or other media connection has been set up are commonly referred to as mid-call features. Many mid-call features perform complex functions such as handling multiple far parties and multiple devices. These are powerful features that interact with other features in subtle and previously little-understood ways. If these interactions are not managed correctly, a service will be poorly integrated, difficult to use, difficult to implement, and unreliable. If these interactions are not specified correctly, service requirements will be incomplete, ambiguous, and difficult to test from.

It is with respect to these and other considerations that the disclosure made herein is presented.

SUMMARY

Mid-call features are implemented during a call placed over a communications network. The mid-call features are implemented through a set of mid-call feature modules, each of which having been categorized in accordance with a feature implementation architecture. According to one aspect disclosed herein, an exemplary method for routing requests within a feature server computer to set up a feature implementation includes receiving, at a per-incoming call feature module of a feature server computer, an initial incoming call request, routing the initial incoming call request from the per-incoming call feature module to a multi-call feature module of the feature server computer, routing the initial incoming call request from the multi-call feature module to an omniscient call feature module, routing the initial incoming call request from the omniscient call feature module to a multi-device call feature module, and routing the initial incoming call request from the multi-device call feature module to a per-outgoing device feature module. The per-incoming call feature module is configured to implement at least one per-incoming call feature. The multi-call feature module is configured to implement at least one multi-call feature. The omniscient call feature module is configured to implement at least one omniscient call feature. The multi-device call feature module is configured to implement at least one multi-device call feature. The per-outgoing device feature module is configured to implement at least one per-outgoing device feature.

According to another aspect disclosed herein, a method for routing requests within a feature server computer to set up a feature implementation includes receiving, at a per-incoming device feature module of the feature server computer, an initial incoming device request, routing the initial incoming device request from the per-incoming device feature module to a multi-device call feature module, routing the initial incoming device request from the multi-device call feature module to an omniscient call feature module, routing the initial incoming device request from the omniscient call feature module to a multi-call feature module, and routing the initial incoming device request from the multi-call feature module to a per-outgoing call feature module. The per-incoming device feature module is configured to implement at least one per-incoming device feature. The multi-device call feature module is configured to implement at least one multi-device call feature. The omniscient call feature module is configured to implement at least one omniscient call feature. The multi-call feature module is configured to implement at least one multi-call feature. The per-outgoing call feature module is configured to implement at least one per-outgoing call feature.

According to yet another aspect disclosed herein, a feature server computer configured to implement call features during a call placed over a communications network includes a processor and a memory in communication with the processor. The memory has a plurality of call feature modules stored thereon. The plurality of call feature modules include a per-incoming call feature module, a multi-call call feature module, a per-outgoing call feature module, an omniscient call feature module, a multi-device call feature module, a first contact call feature module, a per-outgoing device feature module, and a per-incoming device module. Each of the call feature modules include computer-executable instructions that, when executed by the processor, cause the processor to implement, for the call, at least one call feature categorized in the particular call feature modules in accordance with a feature implementation architecture.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, routers, switches, and the like.

Feature Composition—Usages and Features

Figure 1:
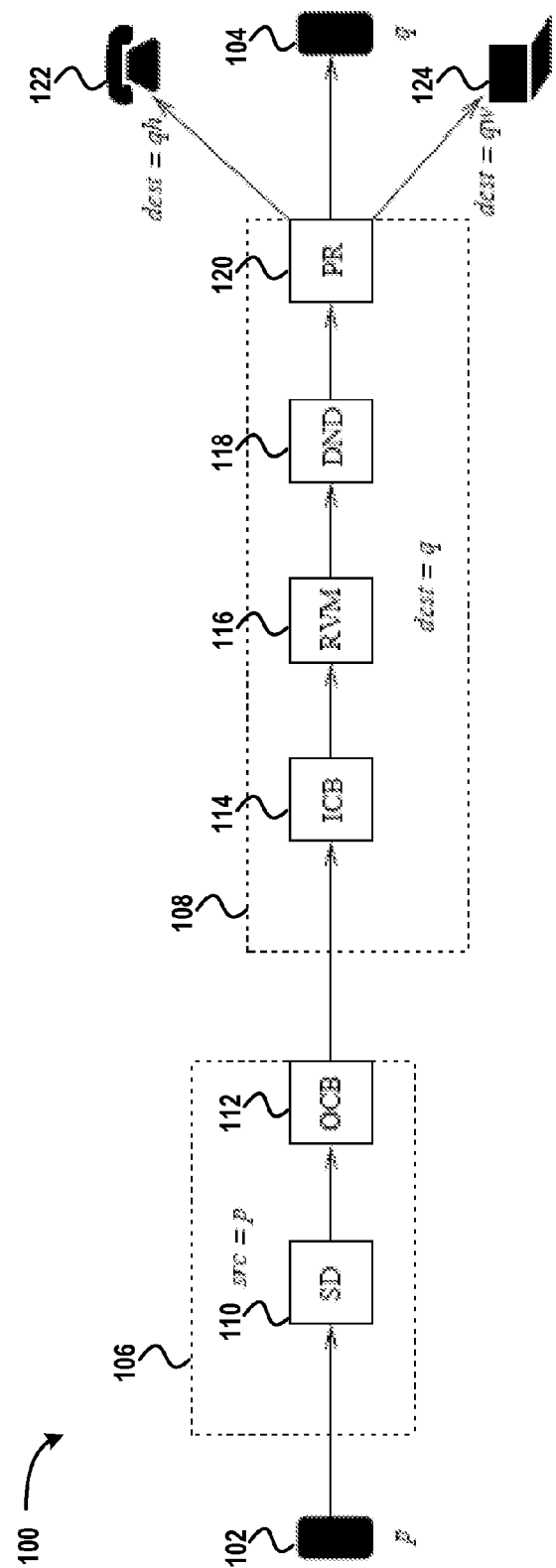
FIG. 1 is a diagram schematically illustrating a usage formed to implement a call.

Referring now to FIG. 1, a diagram schematically illustrating a usage 100 formed to implement a call will be described. A usage, as used herein, refers to a dynamic diagram of dialogs and feature boxes in accordance with a Distributed Feature Composition ("DFC") architecture. Details of a DFC architecture can be found in U.S. Pat. No. 6,160,883, which is incorporated herein by reference. A dialog, as used herein, is an instance of a call-control signaling protocol, such as Session Initiation Protocol ("SIP"). A feature box, as used herein, represents a concurrent software process that implements an instance of a feature, for example, within a feature (application) server computer. A call, as used herein, is an attempt by one communicating entity (usually, but not always, a person) to connect to another communicating entity via a telephone. The illustrated usage 100 particularly represents an implementation of a call utilizing various nodes and arrows.

The nodes of the usage 100 include devices and feature boxes. The illustrated usage 100 includes feature boxes related to call-setup features. These call set-up features are illustrated as solid boxes with a label identifying the particular call-setup feature represented by a given box. Other features including mid-call features described herein below are represented in the various FIGURES in the same manner. Devices are represented as solid black icons representing various types of devices including mobile phones, landline telephones, IP telephones, and/or computers. Generally, the devices used herein include functionality of a telephone to send and receive audio and/or video calls. Devices are labeled with a letter, such as p, q, qh, or qw, identifying a telephone number associated with a particular device. As will be described in greater detail below, a telephone number may be a personal telephone number or a device telephone number. For convenience and ease of description, a telephone number and a device may, at times, be collectively referred by a label, such as p, q, or the like. Moreover, a subscriber is used herein to refer to a person and/or a telephone number.

The usage 100 illustrated in FIG. 1 composes its features because signals traveling from one device to another must pass through all features. Each feature can modify a given signal for its own purposes, so that the overall behavior of the usage reflects the functions of all of the features. This is known as a pipes-and-filters composition.

FIG. 1 illustrates the usage 100 implementing a single call from a person with a telephone number p to a person with a telephone number q via a device p 102 and device q 104, respectively. A source subusage 106 marked src=p contains the feature boxes that are present because the call originates from p. A destination subusage 108 marked dest=q contains the feature boxes that are present because the call terminates at q. All six of the illustrated features are call-setup features. As mentioned above, the interactions of call-setup features are generally well-known; however, in an effort to describe various novel aspects presented later herein, the usage 100 is described for call-setup features, so that the reader may gain an understanding of the terminology used herein, as briefly referenced above and as described in greater detail now below.

The various embodiments disclosed herein assume that all features are implemented in a network and, more particularly, in one or more application servers deployed for the purpose of providing one or more features. For example, each subusage of FIG. 1 may be implemented in a feature server assigned to its subscriber, so that the two subusages may be implemented in different servers interconnected via a network connection.

A dialog begins when a feature box or a device sends a setup signal to another feature box or device. The setup signal carries both source and destination telephone numbers. Once the setup signal has been acknowledged, the dialog exists, and its signaling channel can be used for commands, status signals, and control of media channels. A dialog can be torn down at any time, from either end.

Status signals in a dialog protocol include an alerting signal, an avail signal, and an unavail signal. All of these signals travel from the callee (i.e., the incoming end of the dialog) to the caller (i.e., the outgoing end of the dialog). The alerting signal indicates that the person identified by the destination number is being notified of an incoming call. The avail signal indicates that the person identified by the destination number is available for communication. The unavail signal indicates that the person identified by the destination number is not available for communication.

A well-designed feature box includes properties of transparency, autonomy, and context-independence. Transparency means that when a feature is not active, it is unobservable by other boxes in the diagram. In this case, the feature is acting as an identity element, merely relaying signals from one dialog to another. Autonomy means that when a feature needs to perform some functions, it does so without help from other feature boxes. A feature box may act autonomously because it is located within a signaling path between user devices, where it can observe all the signals that travel between the user devices. Because the feature box is a protocol endpoint, it can absorb or generate any needed signals. Context-independence means that a feature does not rely on the presence of other features, or does not contain any knowledge of other features. In other words, a feature box does not know what is at the other end of the dialogs in which it participates.

FIG. 1 illustrates a representative sample of call set-up features that will be used as examples throughout this disclosure. As illustrated in FIG. 1, features associated with a source telephone number p include a Speed Dialing ("SD") feature 110 and an Outgoing Call Blocking ("OCB") feature 112 within the source subusage 106.

The SD feature 110 examines a setup signal to determine if a destination field thereof contains a short code rather than a telephone number. If the destination field contains a short code, the SD feature 110 replaces the code with the telephone number that the subscriber has assigned thereto. In all other respects, the SD feature 110 is transparent.

The OCB feature 112 is configured by an authority other than the subscriber, such as a parent of the subscriber. The OCB feature 112 examines a setup signal to determine if the subscriber is allowed to call a dialed destination. If it is determined that the subscriber is allowed to call the dialed destination, the OCB feature 112 is transparent. If it is determined that the subscriber is not allowed to call the dialed destination, the OCB feature 112 generates an error message for the subscriber and tears down the subscriber's incoming dialog, which causes the usage 100 to be torn down all the way back to the originating device, the device p 102.

As also illustrated in FIG. 1, features associated with a destination telephone number q include an Incoming Call Blocking ("ICB") feature 114, a Redirect to Voice Mail ("RVM") feature 116, a Do Not Disturb ("DND") feature 118, and a Parallel Ringing ("PR") feature 120.

The ICB feature 114 blocks undesired calls similar to the OCB feature 112, but with two differences. First, the ICB feature 114 is typically configured by its own subscriber. Second, the ICB feature 114 blocks a call by sending an unavail signal and then tearing down the incoming dialog for the call, and in so doing, a subscriber cannot observe why his or her call did not succeed.

The RVM feature 116 is initially transparent. If the RVM feature 116 receives an unavail signal through its outgoing dialog, the RVM feature 116 tears down its outgoing dialog, creates another outgoing dialog with a destination of a voice mail server, and becomes transparent. The voice mail server will accept the dialog (i.e., connecting the dialog to the caller through the RVM feature 116), send an avail signal on behalf of the subscriber, and prompt the caller to leave a voice mail for the subscriber.

If the DND feature 118 is currently disabled by a subscriber, the feature box for the DND feature 118 behaves transparently. If the DND feature 118 is currently enabled, the DND feature 118 allows only important calls to be connected to the subscriber, so that the subscriber is not otherwise disturbed. The DND feature 118 decides whether a call is important by taking the caller's word for it. Because the DND feature 118 cannot make any assumptions about the caller's device, the DND feature 118 utilizes a user interface implemented as audio announcements, prompts, and/or touch-tones to receive the caller's advice regarding the importance of a given call.

When the DND feature 118 is enabled, upon receiving a setup signal, the DND feature 118 employs a media resource to announce to the caller that the subscriber wishes to be undisturbed. The DND feature 118 then prompts to ask the caller, via, for example, a touch-tone response, if the call is important. If the call is not important as determined by the caller's response, the DND feature 118 sends an unavail signal upstream and terminates, so as not to disturb the subscriber for casual or unimportant calls. If the call is important, the DND feature 118 creates an outgoing dialog and is transparent for the remainder of the call.

The PR feature 120 creates concurrent outgoing dialogs to a list of phone numbers supplied by the subscriber; for example, a home telephone number phone qh associated with a home phone qh 122 and a work phone number qw associated with a work phone qw 124. The PR feature 120 also creates a dialog to the subscriber's mobile phone, illustrated as the device q 104 at telephone number q.

It should be noted that a phone or other user device will send an avail signal upstream when a user answers the phone or other user device. If the PR feature 120 receives an avail signal from one of its downstream branches, then the PR feature 120 tears down the other branches and forwards the avail signal upstream. If the PR feature 120 receives an unavail signal from all branches, or if the PR feature 120 times out, then the PR feature 120 tears down all the branches, sends an unavail signal upstream, and terminates the call.

Feature Composition—Routing & Feature Interactions

The mechanism by which usages are assembled is referred to herein as a feature router. Each time a box initiates a dialog, a setup signal goes to a feature router, which selects a feature box or a device to receive the setup signal, and forwards the setup signal to the intended recipient.

A continuous routing chain from one device to another contains a source region and a destination region. A source region contains feature boxes working on behalf of a source telephone number in its role as the caller. A destination region contains features boxes working on behalf of a destination telephone number in its role as the callee. Each number may subscribe to one or more features in each region.

In FIG. 1, the source telephone number p subscribes in a source region to the SD feature 110 and the OCB feature 112, while the destination telephone number q subscribes in a destination region to the ICB feature 114, the RVM feature 116, the DND feature 118, and the PR feature 120. In the illustrated usage 100, the source region includes the source subusage 106 and the destination region includes the destination subusage 108. It should be understood, and will be described below, that a region may include one or more subusages. It should also be understood that, in each region, the subscribed features of a telephone number may have a precedence order that determines the order in which the features are assembled into a usage.

A simple routing chain from device to device begins when the calling device creates a setup signal with a new routing method of DFC and sends it to a feature router. The source field of the setup signal is the number of the device. To continue the chain, a feature box takes a setup signal it has received and applies a continue method of DFC thereto. The continue method returns a setup signal, which the feature box then sends to a feature router. Each method returns a setup signal with the fields set so that a feature router can construct each region according to the precedence order.

If a feature is added to a subscriber's feature set, it is determined whether the feature's signaling actions should be merged and prioritized with respect to the signaling actions of other existing features. This is the most common kind of feature interaction in a pipes-and-filters architecture. Once the desirable behavior for the new feature has been determined, the feature is implemented by adjusting the precedence order of the subscriber's feature set. For example, the SD feature 110 and the OCB feature 112 interact because the SD feature 110 changes the destination field of a setup signal and the OCB feature 112 examines the destination field of a setup signal. The OCB feature 112 should see the actual destination that will be called, so the SD feature 110 should precede the OCB feature 112 in a source region, as in the illustrated source region. The precedence order shown in FIG. 1 yields behavior that satisfies the most common user expectations.

Many feature capabilities and ways of composing features are known, but these are not equally useful. For instance, often features are described as sets of action rules on the call state with pre- and post-conditions. In these schemes, feature composition is the union of the rule sets, and feature interactions are detected as conflicts between action rules from different features.

Rule-based feature constructs have not had much impact on practice because the common ground of interaction between two features is the entire call state, which can become arbitrarily complex as features are added. A primary advantage of a pipes-and-filters composition is that the common ground of interaction between two features is only the dialogs between them, which grow little in complexity even in complex feature sets. Pipes-and-filters composition is constructive, and provides in precedence a simple mechanism for managing many feature interactions.

Mid-Call Features Where Joins Occur—Understanding the Interactions

Figure 2:
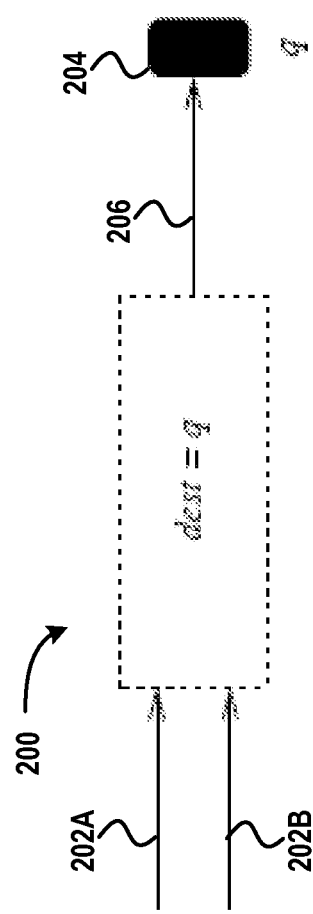
FIG. 2 is a diagram schematically illustrating a personal usage of a device when a mid-call join feature is active, according to an exemplary embodiment.

Turning now to FIG. 2, a diagram schematically illustrating a personal usage 200 of a telephone number q when a mid-call feature is active will be described. A personal usage, as used herein, is a portion of a usage containing all the features of a particular subscriber (e.g., q). Starting at a time when the subscriber has no telephone activity, a personal usage is assembled when the subscriber first places or receives a call. Mid-call features allow a personal usage to change shape while the subscriber is talking. When the subscriber returns to a state of no telephone activity, the personal usage is torn down piece by piece and disappears.

A typical call set-up feature is subscribed to in one region only. This is because during call set-up, the caller (i.e., the source) and the callee (i.e., the destination) play very different roles. Mid-call features, on the other hand, operate when the caller/callee roles distinctions no longer matter at all or as much as during call set-up, and both ends of the call are symmetric. For this reason, mid-call features are subscribed to in both source and destination regions.

One well-known mid-call feature is call waiting ("CW"). CW is initially transparent, and its function is triggered only when it receives a new incoming call for a subscriber. CW sends an alerting signal to the new call as if the subscriber's device was ringing, and sends a signal to the subscriber that a call is waiting. On the subscriber's command, CW will switch the subscriber back and forth between old and new calls. If CW receives another incoming call while it is already handling two calls, it will refuse the third call. CW interacts with unavailability features, such as RVM, by narrowing the circumstances under which the unavailability features are triggered.

The personal usage of a destination appears different when a mid-call feature is active (as in FIG. 2) versus a call set-up feature (as in FIG. 1). For example, because CW is a mid-call feature, the subscriber has selected one device, and there is now only one outgoing dialog instead of three. More relevantly, CW allows a new incoming call to join an existing usage. In FIG. 2, the personal usage 200 has two incoming dialogs 202A, 202B instead of one, as shown in FIG. 1. Each of the incoming dialogs 202A, 202B represents a different incoming call to the destination telephone number q at a device q 204. The two incoming dialogs 202A, 202B share a single outgoing dialog 206 that connects the personal usage 200 to the destination telephone number q via the device q 204, which, in the illustrated embodiment, is a mobile phone.

Mid-call features that employ a join function are referred to herein as join features. Any join feature raises two questions that should be answered before implementation can be completed:

(1) In the personal usage of q, how many instances are there of each of the other features? To which dialogs does each apply?

(2) How is the single outgoing dialog shared by the multiple incoming dialogs?

For ICB and RVM features, the answer to the first question is: two, one applying to each of the incoming dialogs. PR, on the other hand, should only be applied when the first incoming call triggers the personal features to make contact with the subscriber. After PR has helped the subscriber choose and answer a device, the subscriber will remain connected on the same device while CW receives additional calls. So, for PR, the answer to the first question is: one, applying to the outgoing dialog.

DND may be like ICB and RVM, or like PR. Once the subscriber has been disturbed by a first incoming call, does DND allow subsequent incoming calls through? If so, DND belongs in the same category as PR. Does DND continue to apply whether or not the subscriber has been disturbed by an urgent call? If so, DND belongs in the same category as ICB and RVM. It should be noted that the DND implementation remains the same in either case, and only its location in a personal usage will be different.

If a subscriber has multiple join features, then different incoming calls can join a usage in different locations in a personal usage, and therefore have different features applied to them. This means that the above questions apply separately to each join point. It also makes it beneficial to distinguish the calls that should join in one place from the calls that should join in another.

As an additional simplification to aid in understanding the aspects disclosed herein, it is assumed that a personal feature set has only one join feature. This simplification does not mean that there can be only one join feature. For example, Emergency Break-In ("EBI") is a feature that allows an emergency call to break into an existing usage. The implementation of EBI is similar to the implementation of CW, except EBI gives priority to the emergency call.

Emergency calls can be distinguished from normal calls because they are all to device numbers, while normal calls are calls to personal numbers. The personal features ICB, RVM, DND, and PR do not typically apply to emergency calls. To provide for this behavior, and also to manage other feature interactions as will be described below, device numbers for devices are to be distinct from personal numbers for devices. As such, in the subsequent embodiments, devices may have device telephone numbers pm and qm, while p and q remain as personal telephone numbers. Device numbers need not be public.

Mid-Call Features Where Joins Occur—Managing the Interactions

The following description will describe how a desired behavior can be implemented using advanced capabilities of DFC. Returning first to CW and how joins occur, all the call set-up features in FIG. 1 are considered free, meaning that when a feature router needs to route a dialog to a feature box of that type, it creates a new instance of the feature. Joins require features that are bound rather than free. If a feature is bound, then there is at most one box (i.e., instance) of that feature per subscriber. When a feature router needs to route a dialog to a box of that type for a particular subscriber, and there is already one in use for that subscriber, the feature router sends the dialog to the existing feature box. Feature boxes that are bound are illustrated with a heavier line to emphasize their bounded nature.

Figure 3:
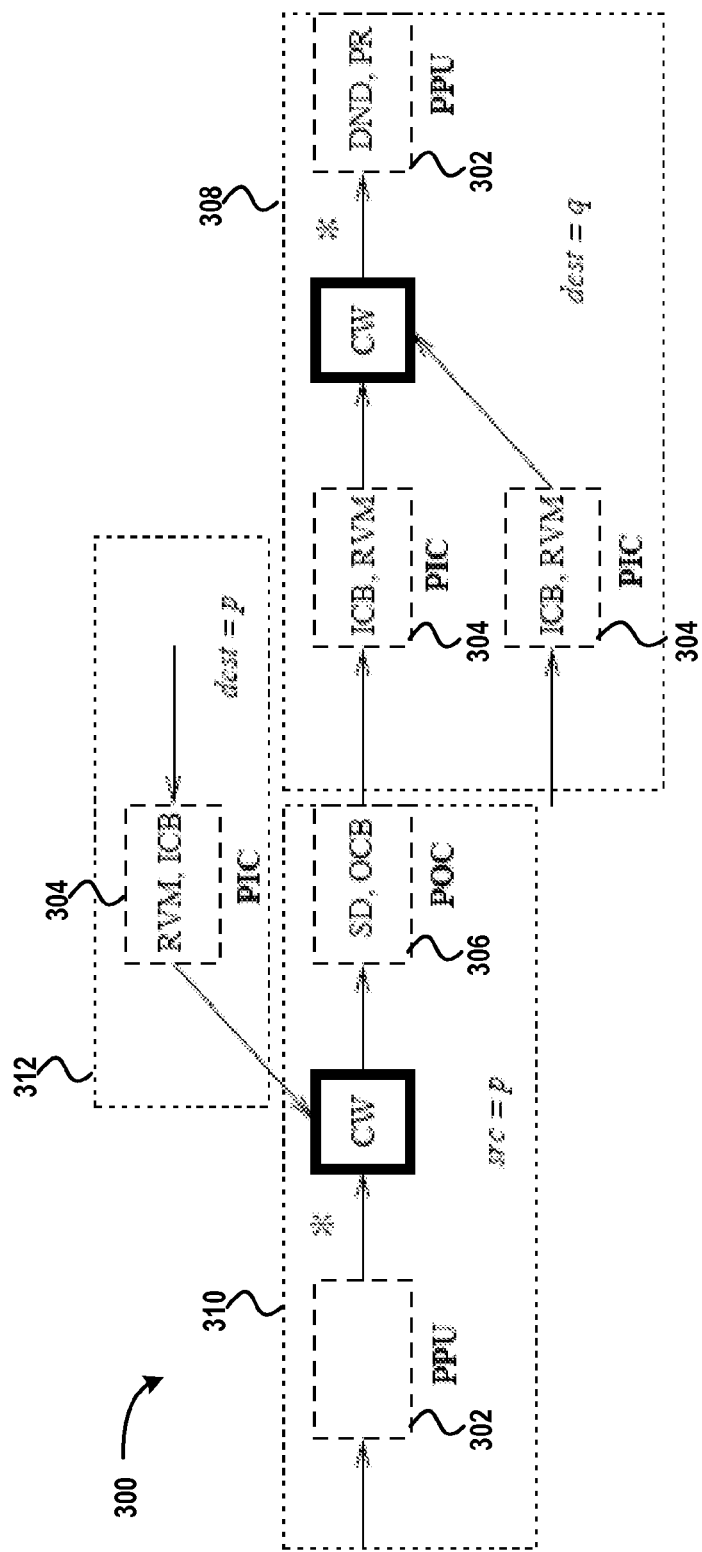
FIG. 3 is a diagram schematically illustrating a mid-call feature that divides a personal usage into per-personal usage ("PPU"), per-incoming-call ("PIC"), and per-outgoing-call ("POC") subusages, according to an exemplary embodiment.

Turning now to FIG. 3, CW divides a personal usage 300 into three portions or subusages. In particular, the personal usage 300 includes a portion referred to as a per-personal-usage ("PPU") subusage 302 because each feature is instantiated only once in each personal usage. The personal usage 300 also includes per-incoming-call ("PIC") subusages 304 including features that apply separately to each incoming call regardless of whether the entire personal usage is new or not. The personal usage 300 also includes a per-outgoing-call ("POC") subusage 306 including all the source features that apply separately to each outgoing call, regardless of whether the entire personal usage is new or not.

The feature interactions are managed by setting the precedence order in a destination region 308 for q, so that the features included in the PIC subusages 304 precede CW and the features in the PPU subusage 302 follow CW. As described above, ICB and RVM are PIC features. In this example, DND and PR are PPU features.

If the first call of the personal usage 300 is outgoing, as is the case for telephone number p in the illustrated embodiment, then CW divides a source region 310 for p into the PPU subusage 302 and the POC subusage 306. The feature interactions are managed by setting the precedence order in the source region 310 for p, so that the features included in the PPU subusage 302 precede CW and the features in the POC subusage 306 follow CW. In the illustrated embodiment, there are no features in the PPU 302 for p, and SD and OCB belong to the POC 306 for p.

A subsequent incoming call to p adds another PIC subusage 304 to a destination region 312 for p. Note that if there were a PPU subusage in the destination region 312 for p, it would be assembled as a set of source (i.e., outgoing) features, yet its dialogs would be required to carry the signals of this incoming call.

Each PIC or POC subusage may contain a chain of dialogs, all of which represent the same call. A PPU subusage also has a chain of dialogs, but these dialogs may be shared among multiple incoming or outgoing calls. Sharing has two implications. First, it is usually necessary to represent call information (status, commands) differently in the shared and unshared portions of the personal usage. For example, an incoming dialog setup signal in a PIC or POC subusage turns into a special mid-call CW signal in the PPU subusage. It is also usually needed to associate per-call signals in the PPU subusage with the calls to which the signals belong. Thus, the call identifiers carried by the signals may differ from the call identifier with which the subusage was set up.

All PPU features may handle shared dialogs. In practice this is not usually a burdened. For example, the PPU features DND and PR are call set-up features, so these features are triggered only by the setup signals of their incoming dialogs. After performing their functions, these features handle all mid-dialog signals transparently, which is correct whether the signals are shared or not.

In some cases, a user interface to personal features employs a browser or other non-telecommunication application on a device. In this design, user-interface messages do not travel through the dialogs of a usage. To implement this design, each message to or from the device is associated with the correct per-subscriber and per-call instance of the correct feature. After it is implemented, there are fewer dialog feature interactions because the user interface is independent of the dialog protocol.

Figure 4:
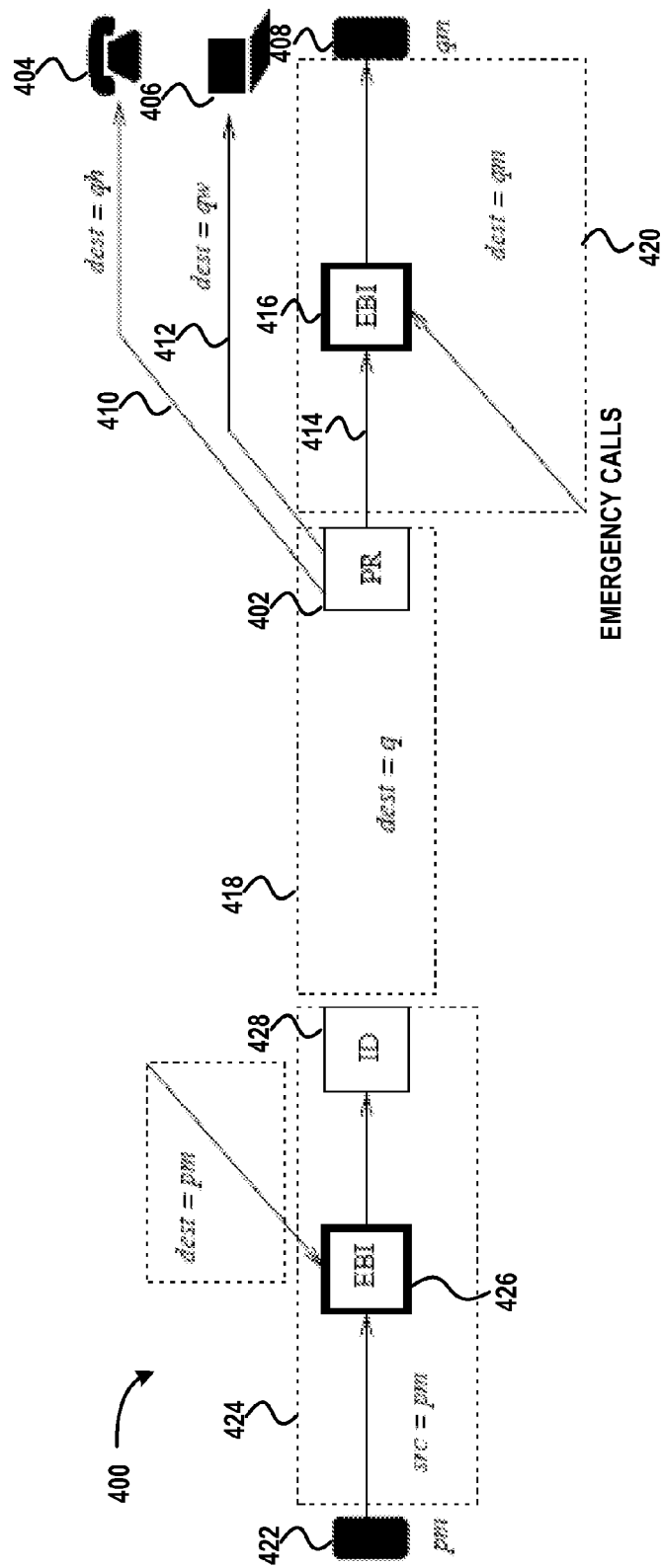
FIG. 4 is a diagram schematically illustrating a mid-call join feature in a device zone instead of a personal zone, according to an exemplary embodiment.

Turning now to FIG. 4, the relationship between personal features and EBI will be described. Transitions between personal and device numbers will now be described to aid in understanding the description of FIG. 4.

A source feature may change the source number in its incoming dialog to a different source in its outgoing dialog. Likewise, a destination feature may change the destination number. Features in each region may also change the opposite telephone number, but this does not affect feature routing. FIG. 4 illustrates a usage 400 in which a PR feature 402 changes a destination telephone number q associated with a subscriber (not shown) to a destination telephone number qh associated with a home device qh 404, a destination telephone number qw associated with a work device qw 406, and a destination telephone number qm associated with a mobile device qm 408 in its three outgoing dialogs 410, 412, 414.

If the destination telephone number qm subscribes to its own destination feature EBI 416, as in the illustrated embodiment, then the chain from the source telephone number pm to the destination telephone number qm will contain a destination region consisting of two destination zones, one for the destination telephone number q, illustrated as a destination zone q 418, and one for the destination telephone number qm, illustrated as a destination zone qm 420. Emergency calls are given the destination telephone number qm by their callers, so that these calls will be routed directly to the destination zone qm 420, without passing through the destination zone q 418.

A source region for telephone number pm associated with a device pm 422 may also contain two zones, one for telephone number p (not shown) and one for telephone number pm (illustrated as a source zone pm 424). In addition to an EBI feature 422, a source zone pm 424 includes an Identification ("ID") feature 428, which changes source telephone number pm to source telephone number p. It should be understood that in more complex feature sets, there can be multiple layers of phone numbers, multiple zones, and multiple join points in usages.

Mid-Call Features that Initiate New Calls

Returning briefly to a CW feature and FIG. 3, it should be understood that a CW feature box, which is assembled into a personal usage during handling of the first call of a personal usage, may be routed to in either source or destination regions. For example, in FIG. 3, the CW feature for telephone number p was routed to in the source region 310 for p, and the CW for q was routed to in the destination region 308 for q.

During initialization, a CW program may check the region of its incoming dialog and orient itself properly. If the dialog is routed in a source region, then it comes from the subscriber, and its continuation goes toward a far party. If the dialog is routed in a destination region, then it comes from a far party, and its continuation goes toward the subscriber. In either case, the dialog connecting CW to its subscriber is referred to herein as its anchor dialog. An anchor dialog may last as long as a personal usage does, while dialogs that connect CW to far parties may be set up and torn down more frequently. In FIG. 3, the anchor dialogs of CW are marked with asterisks.

Figure 5:
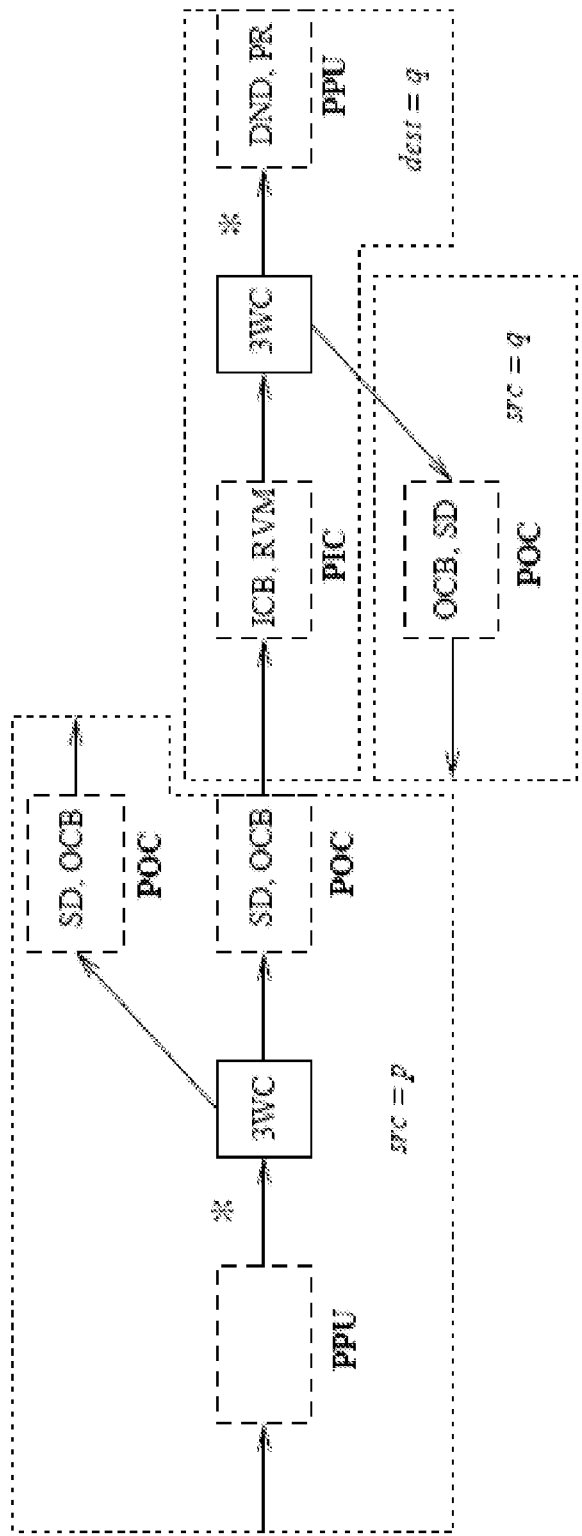
FIG. 5 is a diagram schematically illustrating a call-initiating feature that divides a personal usage into PPU, PIC, and POC subusages, according to an exemplary embodiment.

A personal feature set usually has a feature to initiate new outgoing calls while there is already a call in progress, so that conference calls can be formed. The earliest form of this feature was Three-Way Calling ("3WC"). 3WC is similar to CW in forming usages with a single dialog connecting the usage to a device, and multiple dialogs connecting the usage to far parties. 3WC has the same feature interactions as CW, managed in the same way, as illustrated in FIG. 5.

3WC has an additional feature interaction that CW does not have. Because CW initiates new calls, it raises the questions: What are the source numbers of these calls, and what personal features apply to them? In the personal usage of p, 3WC continues its anchor dialog, so that all of its outgoing dialogs have the same source (p) and have the same features applied to them (the POC subusage).

For the 3WC feature of q, on the other hand, the answer is different, because 3WC is reversing roles. The source of the new outgoing dialog is the destination of its anchor dialog (q). Even though the box was routed after PIC features in the destination region, its outgoing dialog is to be routed through the POC features. This behavior cannot be accomplished by continuing the anchor dialog, which is a destination-region dialog. To manage this feature interaction in DFC, DFC's third routing method, named reverse, is used. The reverse method operates on the setup signal of an existing incoming or outgoing dialog, reversing its source/destination numbers and routing region. The effect of the reverse method applied to the anchor dialog of q's 3WC is a setup signal that is to be routed to SD, as the first feature in the POC subusage of q.

It should be understood that, like the continue routing method described above, the reverse routing method allows a feature program to change the source or destination field in the new dialog. 3WC should not change the source field, because the source field contains the subscriber's number. The destination field, however, may be changed to reach a new far party. Consequently, the method invocation that creates the setup signal for 3WC's new dialog may be characterized abstractly as a reverse routing method (dialog=anchor, dest=newFarParty).

Figure 6:
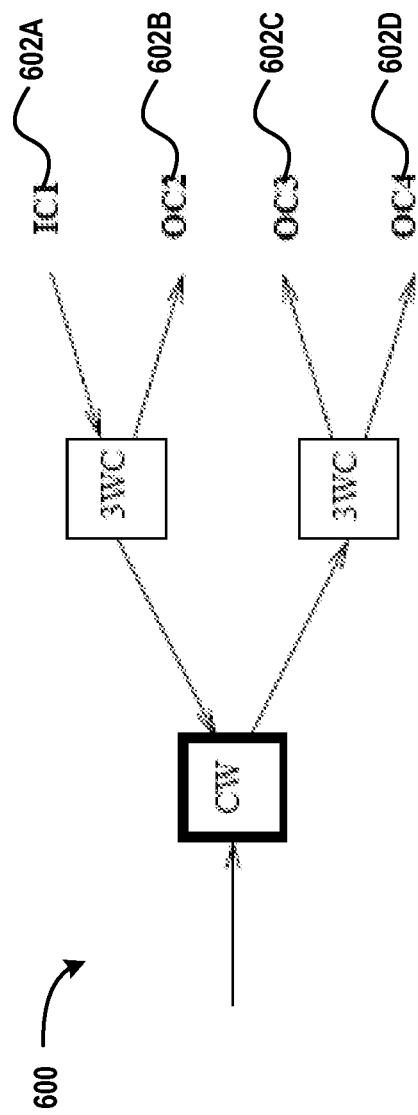
FIG. 6 is a diagram schematically illustrating various interactions of multi-call features, according to an exemplary embodiment.

Because CW and 3WC are both multi-call features, they interact directly through the selection of calls they manipulate. When implemented separately in DFC, their interactions show up as tree structures in a usage. FIG. 6 illustrates a tree structure 600 that shows incoming call 1 ("IC1") 602A, outgoing call 2 ("OC2") 602B, outgoing call 3 ("OC3") 602C, and outgoing call 4 ("OC4") 602D divided into groups. For example, a subscriber cannot form a conference containing the IC1 602A and the OC3 602C. If this kind of grouping behavior is desired, then the tree structure 600 is a good way to analyze and implement it.

When a personal feature set includes joining and conferencing among calls regarded as equals, it is advisable to implement a single "multi-party" control feature that performs both functions. This leads to a better user interface and fewer constraints on what the subscriber can do. Not surprisingly, contemporary "smart" mobile phones typically combine CW and conferencing. These devices are also typically capable of handling more than four calls at a time, which would not be intelligible to users without better interface and integration.

Per-Personal-Usage Mid-Call Features

The following description details a PPU subusage, dividing it into finer-grained subusages. First, two new mid-call features are introduced and are to be used as examples.

Recording ("Rec") is a mid-call feature that records the voice channel, in both directions, whenever a subscriber desires. Rec is placed in a PPU subusage so that it can capture everything that the subscriber hears and says.

Switch Phones ("SP") is a mid-call feature that enables a subscriber to move from one device to another while maintaining a conversation. A well-designed SP feature creates a three-way conference during the transition, so that no part of the conversation is lost. SP is placed in the PPU subusage so that all of the subscriber's calls are moved at once.

When SP is activated, it creates a new branch (i.e., a chain of dialogs) to a new device that eventually takes over from the first or existing device branch. Because of this behavior, SP raises many of the same questions as join and conferencing features, except on the device side of the personal usage instead of the network side: Which features should apply to the personal usage, independent of its device branches? Which features should apply to each device branch of the personal usage? What is the source telephone number of the new device branch? FIG. 7 illustrates the resolution and management of these feature interactions.

Figure 7:
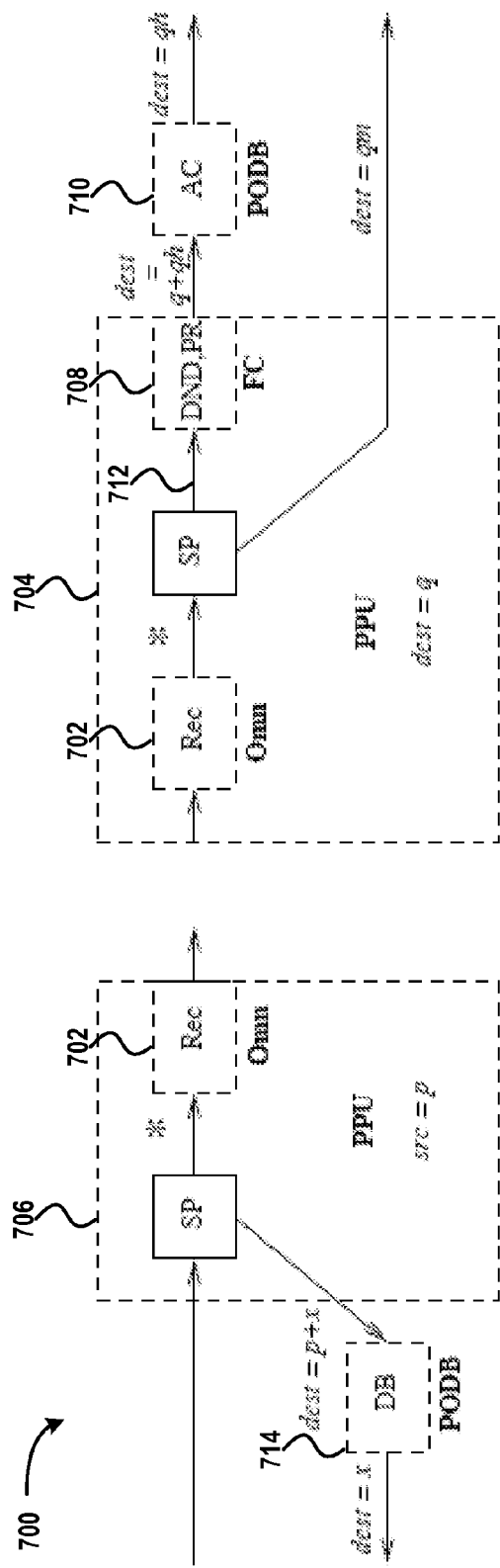
FIG. 7 is a diagram schematically illustrating PPU subusages and per-outgoing-device-branch ("PODB") subusages of personal usages of two devices, according to an exemplary embodiment.

Turning now to FIG. 7, a subusage of a personal usage 700 where the dialogs are shared by all device branches as well as all calls is illustrated. This subusage is referred to herein as an omniscient ("Omn") subusage 702, because features in it can observe all the end-to-end activity in the personal usage. A Rec feature is included in the omniscient subusage, so that it can record from all device branches. In the precedence order, omniscient features precede SP in a destination region q 704, and follow SP in a source region p 706.

Features that apply to separate outgoing device branches follow SP in the destination region q 704. If there are any source features that apply to device branches (i.e., to device branches coming into a personal usage), then they would precede SP in the source region p 706.

The device branches created by SP are fundamentally sequential, even though two may co-exist for a brief handoff period. The first device branch demands different features. The features that apply only on the first contact with the subscriber in this personal usage are provided in an FC subusage 708, and those that apply to each device branch are in a per outgoing device branch ("PODB") subusage 710. It should be understood that PODB subusages are not contained within PPU subusages because, if a personal usage has several device branches, there may be more than one of a PODB feature per personal usage.

DND (as a PPU feature) and PR are illustrated as first-contact features. In DFC, the application of these features only to the first device branch is managed as follows. Because SP routed to in the destination region q 704 continues its initial dialog transparently, a first outgoing dialog 712 from q's SP will have q as its destination, and be routed through DND and PR within the FC subusage 708. In FIG. 7, an incoming call was answered on q's home phone with a device telephone number qh. When subscriber q wants to switch phones, on the other hand, SP sets the destination of its new outgoing dialog to device telephone number qm rather than personal telephone number q. This branch is not routed through the FC subusage 708 features of q.

Just like a 3WC feature box routed to in a destination region, an SP feature box routed to in a source region reverses roles when it creates a dialog to begin a new outgoing device branch. As with 3WC, the SP feature reverses its anchor dialog to create a dialog setup signal that will be routed correctly. The anchor dialogs of the SP feature boxes are marked with asterisks in FIG. 7. 3WC and SP are symmetric features in the sense that 3WC creates new calls (going toward the center of a network) and SP creates new device branches (going toward devices on the periphery of a network). This symmetry is the reason why role reversal is performed by 3WC routed to in a destination region and SP routed to in a source region, which is also symmetric.

To create a dialog setup signal that will be routed correctly, SP routed to in a source region does a method invocation that can be characterized abstractly as a reverse method (dialog=anchor, dest=newDevice). The source field of the dialog setup signal will have the same value as the destination field of the anchor dialog. The feature can also be implemented to use a reverse method (dialog=anchor, dest=newDevice, src=subscriber), if it is considered desirable to identify the new branch as coming from the subscriber. Because the new dialog will be routed in the destination region, the source field will be used for caller identification only.

In some embodiments, it may be beneficial to choose specific PODB features for specific devices. FIG. 7 illustrates two examples of this.

Answer Confirm ("AC") is a feature that distinguishes between a call being answered by a person and a call being answered by a machine. It does this by prompting the callee to enter a touch-tone. AC then signals avail or unavail upstream through its incoming dialog, depending on whether or not it detected the tone.

In the illustrated embodiment, AC is included on outgoing device branches to the home phone qh, because q has a PR feature and the home phone has built-in voice mail. Without AC, voice mail might answer the home phone qh and cause PR to abort branches to other devices. This might prevent the subscriber from answering the call on another device, or it might cause voice mail to be recorded on the home phone rather than the subscriber's personal voice mailbox. AC is included in the PODB subusage 710 in the illustrated embodiment.

On the left side of FIG. 7, subscriber p is using SP to switch to a number x previously unknown to the system. Lest this is used by the subscriber to surreptitiously transfer a far party to a forbidden number, the outgoing device branch is routed through a Device Blocking ("DB") feature of another PODB subusage 714 that checks the number.

Because of the necessity to distinguish between FC and non-FC features, features within a PODB subusage cannot be subscribed to by the personal numbers p and q. They are not, in general, subscribed to by the device numbers qh and x, because the features associated with these devices may have nothing to do with p or q. In DFC, they are subscribed to by special internal numbers, denoted in FIG. 7 as q+qh and p+x to show that they are related to both device and personal numbers. These numbers are internal mechanisms whose only purpose is to cause the DFC routing algorithm to assemble the desired features into personal usages.

SP is not the only possible multi-device feature. Another possible feature in this category is an Add Video ("AV") feature that creates an outgoing device branch of a usage to a video device such as a television or a computer. This feature may enable a subscriber to upgrade a call on a voice-only device to a multi-media call.

Figure 8:
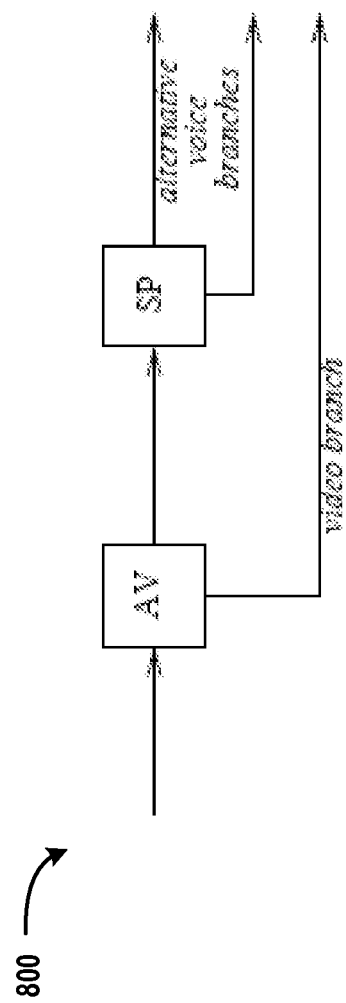
FIG. 8 is a diagram schematically illustrating various interactions of multi-device features, according to an exemplary embodiment.

Just as separate join and conferencing features create tree structures in a usage (see FIG. 6), separate multi-device features also create tree structures (see FIG. 8). For multi-device features to interact correctly, it is necessary to understand the desired shape of the tree and set the precedence order so that routing creates the desired shape.

Above, it was recommended to merge multi-call features into a single feature, because that facilitates treating all calls as equals. The same recommendation does not apply to multi-device features, because multiple device branches are likely to be functionally distinct. A tree structure 800 of FIG. 8, for instance, supports treating voice and video devices differently.

Overview of Multi-Call and Multi-Device Mid-Call Features

Multi-call and multi-device mid-call features interact with all other personal features by forcing decisions about which calls and to which device branches they apply. These decisions affect how often a feature is instantiated, exactly when a feature is instantiated and activated, and exactly which subset of the set of all signals it sees. Although DFC makes it easy to analyze these interactions through the shapes of usages, DFC does not create them. Interactions are intrinsic to the functions of mid-call features, and it is necessary to understand and manage them no matter how a feature set is implemented.

Other interactions caused by mid-call features include:
Multi-call and multi-device features may cause some dialogs to be shared among multiple calls and/or device branches. This introduces new signaling information that is to be encoded so that it is accepted by the dialog protocol and all feature boxes and devices at the endpoints of the dialogs.
Multi-call and multi-device features may reverse roles, raising new questions about the source and destination numbers that should be used after role reversal.
Multi-call features interact with each other by grouping calls in specific ways.
Multi-device features interact with each other by grouping device branches in specific ways.

In addition, all mid-call features that manipulate media streams have the potential to interact with each other in determining correct media paths. DFC includes some advanced capabilities that make it easier to manage these feature interactions. These advanced capabilities include: a flexible protocol that accommodates shared dialogs, bound features, the reverse routing method, and internal telephone numbers. The implementation of these capabilities in SIP frameworks is described below.

Overview of Subusages of a Personal Usage

Figure 9:
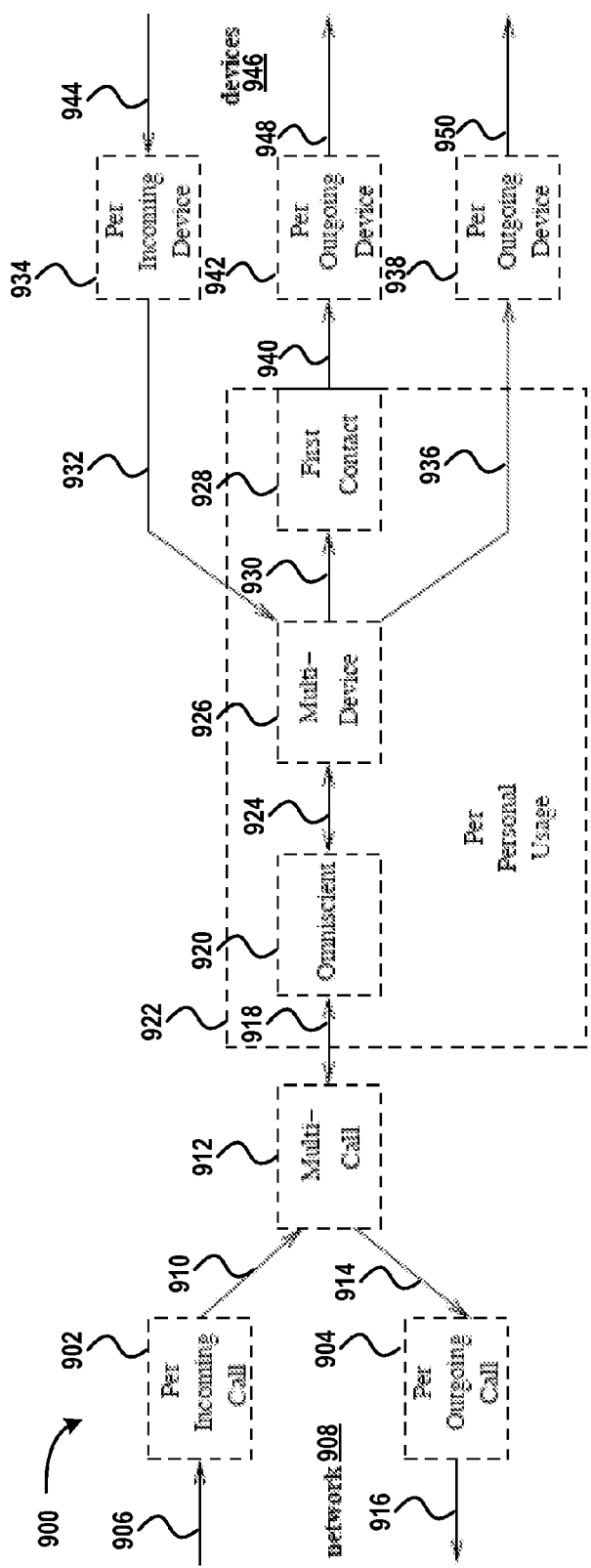
FIG. 9 is a diagram schematically illustrating subusages of a personal usage, according to an exemplary embodiment.

Turning now to FIG. 9, a general architecture 900 in which all features may be placed for a given subscriber is illustrated. A subscriber does not need to subscribe to all features within the architecture 900, but all features may be made available to the subscriber. Each box in the architecture 900 identifies a category in which any given feature may fit. These boxes may also be referred to as subusages, as used in the description of various subusages above. Moreover, these boxes each may be embodied as program modules each including computer-executable instructions that, when executed by a computer, such as a feature server computer, cause the computer to implement one or more features contained therein. For implementation of a particular feature, the particular feature may be reviewed and assigned to one or more of the boxes in the architecture 900. Guidelines for placing features in certain boxes are described above.

In some embodiments, the architecture 900 is an implementation architecture that could be implemented exactly as illustrated in FIG. 9, such as in a feature server. Such implementation provides a robust and modular way to assign features according to their interactions with other features, particularly with regard to mid-call, multi-device, and multi-call features.

In some embodiments, such as when it is not desirable for one reason or another to utilize the architecture 900 as an implementation architecture, the architecture 900 is utilized to define feature interactions regardless of how the features are implemented. In other words, in these embodiments, the architecture 900 defines feature interactions for instances in which an exact architecture is not needed.

Referring now to the left-hand portion of FIG. 9, a per-incoming-call ("PIC") subusage 902 and a per-outgoing-call ("POC") subusage 904 are illustrated. The PIC subusage 902 is associated with an incoming dialog 906 received from a network 908 and an outgoing dialog 910 directed to a multi-call ("MC") subusage 912. The MC subusage 912 is associated with an incoming dialog 910 (i.e., the outgoing dialog 910 for the PIC subusage 902) and an outgoing dialog 914 directed to the POC subusage 904. The outgoing dialog 914 serves as an incoming dialog 914 to the POC subusage 904. The POC subusage 904 is also associated with an outgoing dialog 916 directed to the network 908. The dialogs 906, 910, 914, 916 are illustrated as being unidirectional such that set up occurs only in the direction shown.

The MC subusage 912 is also associated with a bi-directional dialog 918 (i.e., set up could occur in either direction) directed to/from an omniscient ("Omn") subusage 920 of a per-personal-usage ("PPU") subusage 922. The PPU subusage 922 also includes a multi-device ("MD") subusage 926 and a first contact ("FC") subusage 928.

The Omn subusage 920 is also associated with a bi-directional dialog 924 directed to/from the MD subusage 926. The MD subusage 926 is associated with an outgoing dialog 930 directed to the FC subusage 928, an incoming dialog 932 received from a per-incoming-device ("PID") subusage 934, and an outgoing dialog 936 directed to a per-outgoing-device ("POD") subusage 938. The FC subusage 928 is associated with an incoming dialog 930 (i.e., the outgoing dialog 930 for the MD subusage 926) and an outgoing dialog 940 directed to another POD subusage 942.

The PID subusage 934 includes an incoming dialog 944 received from one or more devices 946. The PID subusage 934 also includes an outgoing dialog 932 directed to the MD subusage 926 (i.e., the incoming dialog 932 of the MD subusage 926).

The POD subusage 942 is associated with an incoming dialog 940 (i.e., the outgoing dialog 940 of the FC subusage 928) received from the FC subusage 928. The POD subusage 942 is also associated with an outgoing dialog 948 directed to the one or more devices 946.

The POD subusage 938 is associated with an incoming dialog 936 (i.e., the outgoing dialog 936 of the MD subusage 926) received from the MD subusage 926. The POD subusage 938 is also associated with an outgoing dialog 950 that is directed to the one or more devices 946.

The above dialogs may be embodied as various types of requests such as incoming call requests, outgoing call requests, incoming device requests, and outgoing device requests. Moreover, the requests may be used to initialize the program modules and/or implement various features contains within the various boxes of the architecture 900.

Several specific examples of features in all categories/subusages have been provided above, except per-incoming-device features. In practice, there can be any number of features in these categories. There are also other features that, like DND, can be associated with more than one category, and produce different overall behavior depending on their category. Another example is Talk Limits ("TL"), which limits the number of telephone minutes a subscriber is allowed. TL is a mid-call feature that can be categorized as omniscient or per-call, depending on where it is placed in a given personal usage, since it measures and limits different things.

In the context of converged Web and telecommunication services, there can be a dialog-state notification service, and other services that subscribe to the dialog-state notifications for various purposes. The analysis of mid-call features here shows that the relevant state is actually the state of a personal usage rather than of any particular dialog, and that the state of a personal usage is much more complex than a dialog state. Thus, mid-call features interact with both the notification service and the converged services that subscribe to it.

Click-to-Dial ("C2D") is often an outlier in the feature landscape. In its most common form, C2D creates two outgoing dialogs (sequentially or simultaneously), both routed to destination features. It thus creates a usage with two personal usages, each first assembled with destination routing. The personal usages are themselves normal in all respects, however.

DFC can be used to develop feature sets with fine-grained modularity. In this style, each named function, no matter how simple, is implemented as a separate feature box. Although this style is good for prototyping because it is very flexible, it may incur too much overhead for production use.

To improve performance when using DFC principles, it is often desirable to group more functions into larger feature modules. FIG. 9 illustrates this and provides guidance in doing so, because a successful coarse-grained modularization must be compatible with its structure. The coarse-grained modularization has one feature box per atomic subusage in FIG. 9.

Even coarser-grained modularizations are possible, provided that they coalesce adjacent subusages and preserve the correct instantiations. For example, it is straightforward to combine omniscient functions with multi-call or multi-device functions. It is possible to combine per-call functions with multi-call functions, but the resultant module should have an internal mechanism to instantiate per-call features for each new call. It is inadvisable to combine omniscient functions with first-contact functions.

Implementation in SIP, SIP Servlets, and IMS

Assuming that feature interactions in a feature set are being managed according to DFC principles, the advanced capabilities of DFC (i.e., those beyond simple pipes-and-filters) may be implemented. Below, relevant implementation issues for SIP, SIP Servlets, and IP Multimedia Subsystem ("IMS") will be described.

In a SIP implementation, all the dialogs mentioned above would be invite dialogs. A dialog-setup signal would be a SIP invite, an alerting signal would be a SIP 180, an avail signal would be a SIP 2xx response to the initial invite, and an unavail signal would be a SIP 4xx-6xx response to the initial invite.

Shared dialogs are one of the biggest effects of multi-call and multi-device features. The SIP standard is not written to accommodate shared dialogs, so that many implementations of them are inconsistent with the protocol. For example, a dialog endpoint cannot send a SIP 180 after sending a SIP 2xx response to the initial invite, even though shared dialogs often need to signal "ringing" mid-call.

The most recent SIP Servlet standard is very compatible with the DFC architecture. A servlet corresponds to a feature. An application session corresponds to a feature instance or box. The session key-based targeting mechanism supports the distinction between free and bound boxes. The regions/roles are named originating and terminating instead of source and destination.

Reverse routing has long been a source of confusion, and its history reflects this. The DFC manual says that only an outgoing dialog can be reversed. The SIP Servlet standard says that only an incoming dialog can be reversed. In principle, the incoming/outgoing distinction should make no difference to an implementation. The only necessary restriction on the use of reverse is that the subscriber must subscribe to the reversing feature in both regions, so that the feature has a place in the precedence order of both regions. In practice, an incoming/outgoing restriction is simply a consequence of other implementation decisions.

Unfortunately, the incoming/outgoing distinction does make a difference in the arenas of requirements and behavior. As has been explained above, 3WC and SP should reverse their anchor dialogs because they are the predictable and persistent dialogs. In both the cases where reverse is needed, their anchor dialogs are outgoing (see FIGS. 5 and 7).

Furthermore, consider the behavior of p's SP box (FIG. 7) after it has switched to device x. After the switch is complete, its original incoming dialog will be torn down. If the box is called upon to switch phones again, at that time it will have no incoming dialog, whether anchor or not.

To overcome this deficiency in the SIP Servlet standard, an SP box routed to in a source region can save the setup signal of its original incoming dialog, even after that dialog has been torn down. When it needs to create a new device branch, it can apply the reverse method to the saved incoming setup signal.

The IMS standard builds on SIP and is compatible with application servers programmed using the SIP Servlet standard. Like the servlet standard, IMS recognizes originating and terminating regions. An IMS Serving Call Session Control Function ("S-CSCF") is capable of routing a SIP call through one or more application servers in an originating region, to implement originating features, and one or more application servers in a terminating region, to implement terminating features. Like a DFC feature router, an IMS S-CSCF can create ordered chains of SIP dialogs and application servers. If a subscriber's personal feature set contains a bound feature subscribed to in both regions, then all dialogs routed to that feature for that subscriber, whether in the originating or terminating region, are to go to or within the same application server. This is an additional requirement on application routing that is not mentioned in the standard.

IMS puts subscriber data in separate databases with many administrative constraints. This may make it difficult to use internal telephone numbers to manage feature interactions. Dialogs routed to internal telephone numbers may be confined to within SIP Servlet containers, where these numbers can be configured locally.

Exemplary Computer System

Figure 10:
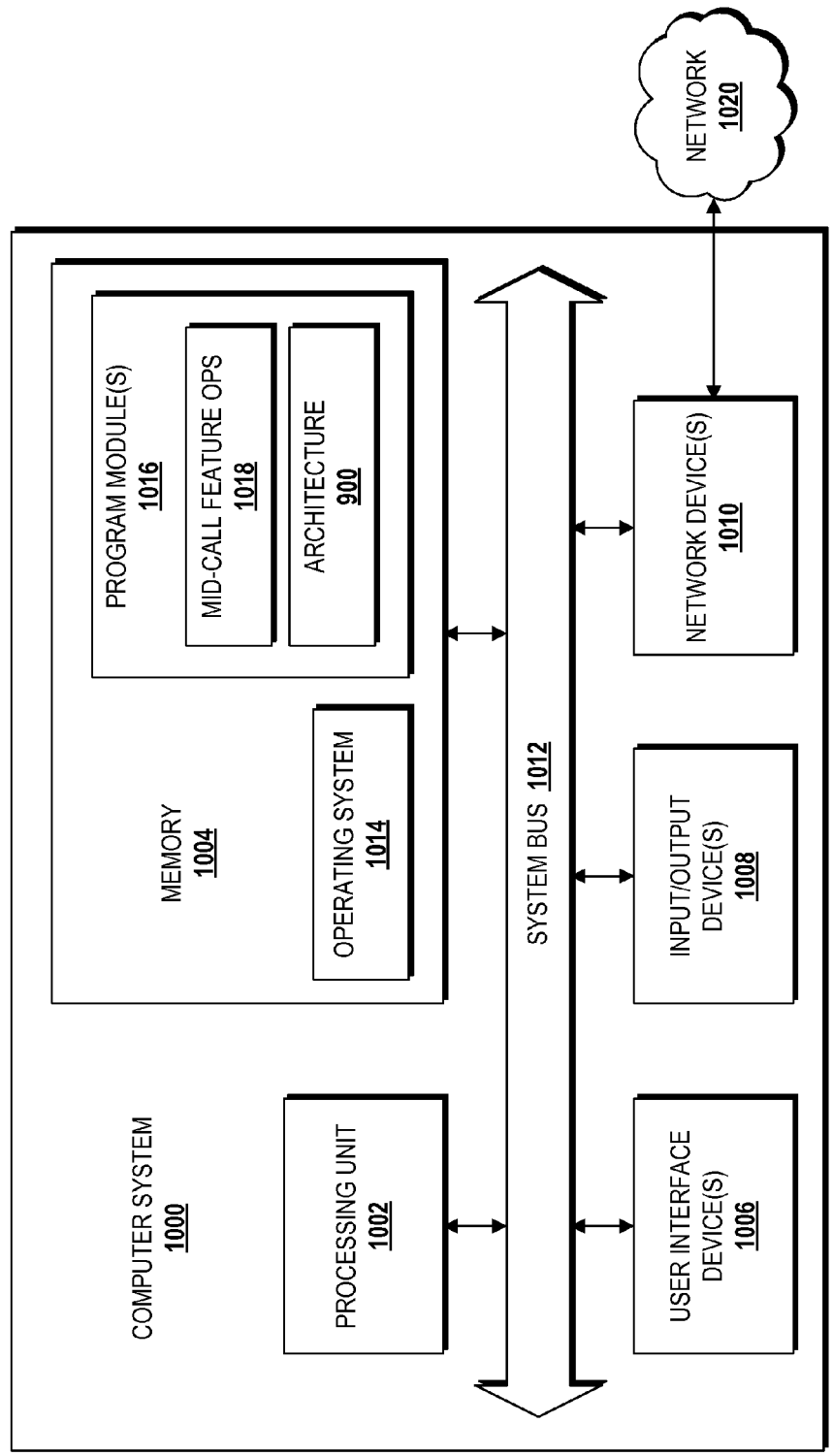
FIG. 10 is a diagram schematically illustrating a computer system and various components thereof, according to an exemplary embodiment.

FIG. 10 is a block diagram illustrating a computer system 1000 configured to implement mid-call features, in accordance with various embodiments of the concepts and technologies disclosed herein. In some embodiments, the computer system 1000 is a feature server computer configured to implement one or more mid-call features in accordance with guidelines provided by a feature implementation architecture, such as the architecture 900 described above with reference to FIG. 9. The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the computer system 1000. Processing units are generally known, and therefore are not described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE CORPORATION, the FREEBSD family of operating systems, the SOLARIS family of operating systems from ORACLE CORPORATION, other operating systems such as proprietary operating systems, and the like. The program modules 1016 may include computer-executable instructions for performing operations 1018 related to the implementation of one or more mid-call features. The program modules 1016 may also include the architecture 900. In some embodiments, program modules 1016, the operations 1018 themselves, and/or the architecture 900 are embodied in computer-readable media containing instructions that, when executed by the processing unit 1002, implement one or more mid-call features requested during a call. According to some embodiments, the program modules 1016 are embodied in hardware, software, firmware, or any combination thereof.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof, does not include waves, signals, and/or other transitory and/or intangible communication media, per se.

The user interface devices 1006 may include one or more devices with which a user accesses the computer system 1000. The user interface devices 1006 may include, but are not limited to, computers, servers, personal digital assistants, telephones (e.g., cellular, IP, or landline), or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network 1020. Examples of the network devices 1010 include, but are not limited to, a modem, a radio frequency ("RF") or infrared ("IR") transceiver, a telephonic interface, a bridge, a router, or a network card. The network 1020 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as WiMAX network, or a cellular network. Alternatively, the network 1120 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

The network 1020 embodied as a cellular network may utilize a mobile telecommunications technology such as, but not limited to, Global System for Mobile communications ("GSM"), Universal Mobile Telecommunications System ("UMTS"), Code Division Multiple Access ("CDMA") ONE, CDMA2000, Long Term Evolution ("LTE"), and various other 2G, 2.5G, 3G, 4G, and greater generation mobile telecommunications technologies. In addition, mobile data communications technologies such as General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), and various other current and future mobile data communications technologies are contemplated for use by the network 1020. Therefore, the embodiments presented herein should not be construed as being limited to a particular mobile telecommunications technology and/or standards utilizing such technologies.

CONCLUSION

The foregoing has explored many previously unreported feature interactions caused by mid-call features, particularly multi-call and multi-device features. The description has been focused and simplified by assuming a personal feature set associated with a mobile telephone number.

During an interval of time when a subscriber has telecommunication activity, a personal usage encompasses the network state of that activity. A personal usage may include the states of multiple incoming and outgoing calls, the state of the subscriber's connection with the network through one or more devices, and the states of relevant features. Because all of these elements of a personal usage can interact, an implementation architecture that represents these elements and their relationships is more robust than one representing calls alone.

The DFC architecture is well-suited to representing personal usages. It is used in this disclosure to analyze feature interactions and manage them by dividing personal features into eight categories. Because DFC does not create these interactions, all implementations of telecommunication services with mid-call features will have to manage them one way or another.

Based on the foregoing, it should be appreciated that technologies for implementing mid-call features in a telecommunications network have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A method for routing requests within a feature server computer to set up a feature implementation, the method comprising:

receiving, at a per-incoming call feature module of the feature server computer, an initial incoming call request, the per-incoming call feature module being configured to implement at least one per-incoming call feature;

routing, at the feature server computer, the initial incoming call request from the per-incoming call feature module to a multi-call feature module of the feature server computer, the multi-call feature module being configured to implement at least one multi-call feature;

routing, at the feature server computer, the initial incoming call request from the multi-call feature module to an omniscient call feature module, the omniscient call feature module being configured to implement at least one omniscient call feature;

routing, at the feature server computer, the initial incoming call request from the omniscient call feature module to a multi-device call feature module, the multi-device call feature module being configured to implement at least one multi-device call feature; and routing, at the feature server computer, the initial incoming call request from the multi-device call feature module to a per-outgoing device feature module, the per-outgoing device feature module being configured to implement at least one per-outgoing device feature.

2. The method of claim 1, further comprising routing, at the feature server computer, an initial outgoing call request from the multi-call feature module to a per-outgoing call feature module, the per-outgoing call feature module being configured to implement at least one per-outgoing call feature.

3. The method of claim 2, further comprising:

receiving, at a per-incoming device feature module of the feature server computer, an initial incoming device request, the per-incoming device feature module being configured to implement at least one per-incoming device feature; and routing, at the feature server computer, the initial incoming device request to the multi-device call feature module.

4. The method of claim 3, further comprising routing, at the feature server computer, the initial incoming device request from the multi-device call feature module to the per-outgoing device feature module.

5. The method of claim 3, further comprising:
routing, at the feature server computer, the initial incoming device request from the multi-device call feature module to a first contact feature module, the first contact feature module being configured to implement at least one first contact feature; and
routing, at the feature server computer, the initial incoming device request from the first contact feature module to the per-outgoing device feature module.

6. The method of claim 3, further comprising:
routing, at the feature server computer, the initial incoming device request from the multi-device feature module to the omniscient call feature module;
routing, at the feature server computer, the initial incoming device request from the omniscient call feature module to the multi-call feature module; and
routing, at the feature server computer, the initial incoming device request from the multi-call feature module to the per-outgoing call feature module.

7. The method of claim 1, further comprising:
receiving, at the feature server computer, a subsequent incoming call request;
routing, at the feature server computer, the subsequent incoming call request to the per-incoming call feature module; and
routing, at the feature server computer, the subsequent incoming call request from the per-incoming call feature module to the multi-call feature module.

8. The method of claim 7, further comprising routing, at the feature server computer, a subsequent outgoing call request from the multi-call feature module to a per-outgoing call feature module.

9. The method of claim 1, further comprising implementing at least one feature by executing, at the feature server computer, instructions contained in at least one of the per-incoming call feature module, the multi-call feature module, the omniscient call feature module, the multi-device call feature module, and the per-outgoing device feature module, wherein the instructions contained in each of the per-incoming call feature module, the multi-call feature module, the omniscient call feature module, the multi-device call feature module, and the per-outgoing device feature module comprise instructions to implement features that are categorized in the per-incoming call feature module, the multi-call feature module, the omniscient call feature module, the multi-device call feature module, and the per-outgoing device feature module in accordance with a feature implementation architecture.

10. A method for routing requests within a feature server computer to set up a feature implementation, the method comprising:
receiving, at a per-incoming device feature module of the feature server computer, an initial incoming device request, the per-incoming device feature module being configured to implement at least one per-incoming device feature;
routing, at the feature server computer, the initial incoming device request from the per-incoming device feature module to a multi-device call feature module, the multi-device call feature module being configured to implement at least one multi-device call feature;
routing, at the feature server computer, the initial incoming device request from the multi-device call feature module to an omniscient call feature module, the omniscient call feature module being configured to implement at least one omniscient call feature;
routing, at the feature server computer, the initial incoming device request from the omniscient call feature module to a multi-call feature module, the multi-call feature module being configured to implement at least one multi-call feature; and
routing, at the feature server computer, the initial incoming device request from the multi-call feature module to a per-outgoing call feature module, the per-outgoing call feature module being configured to implement at least one per-outgoing call feature.

11. The method of claim 10, further comprising implementing at least one feature by executing, at the feature server computer, instructions contained in at least one of the per-incoming device feature module, the multi-device call feature module, the omniscient call feature module, the multi-call feature module, and the per-outgoing call feature module, wherein the instructions contained in each of the per-incoming device feature module, the multi-device call feature module, the omniscient call feature module, the multi-call feature module, and the per-outgoing call feature module comprise instructions to implement features that are categorized in the per-incoming device feature module, the multi-device call feature module, the omniscient call feature module, the multi-call feature module, and the per-outgoing call feature module in accordance with a feature implementation architecture.

12. The method of claim 10, further comprising routing, at the feature server computer, the initial incoming device request from the multi-device call feature module to a per-outgoing device call feature module, the per-outgoing device call feature module being configured to implement at least one per-outgoing device call feature.

13. The method of claim 10, further comprising:
receiving, at a per-incoming call feature module of the feature server computer, an initial incoming call request, the per-incoming call feature module being configured to implement at least one per-incoming call feature; and
routing, at the feature server computer, the initial incoming call request from the per-incoming call feature module to the multi-call feature module of the feature server computer.

14. The method of claim 13, further comprising:
receiving, at the feature server computer, a subsequent incoming call request; and
routing, at the feature server computer, the subsequent incoming call request to the per-incoming call feature module; and
routing, at the feature server computer, the subsequent incoming call request to the multi-call feature module.

15. The method of claim 13, further comprising:
routing, at the feature server computer, the initial incoming call request from the multi-call feature module to the omniscient call feature module; and
routing, at the feature server computer, the initial incoming call request from the omniscient call feature module to the multi-device call feature module.

16. The method of claim 15, further comprising routing, at the feature server computer, the initial incoming call request from the multi-device call feature module to a per-outgoing device feature module, the per-outgoing device feature module being configured to implement at least one per-outgoing device feature.

17. The method of claim 10, further comprising:
receiving, at the feature server computer, a subsequent outgoing call request; and
routing, at the feature server computer, the subsequent outgoing call request from the multi-call feature module to the per-outgoing call feature module.

18. A feature server computer configured to implement call features during a call placed over a communications network, the feature server computer comprising:
a processor; and
a memory having a plurality of call feature modules stored thereon, the plurality of call feature modules comprising
a per-incoming call feature module comprising computer-executable instructions that, when executed by the processor, cause the processor to implement, for the call, at least one per-incoming call feature categorized in the per-incoming call feature module in accordance with a feature implementation architecture,
a multi-call call feature module comprising computer-executable instructions that, when executed by the processor, cause the processor to implement, for the call, at least one multi-call call feature categorized in the multi-call call feature module in accordance with the feature implementation architecture,
a per-outgoing call feature module comprising computer-executable instructions that, when executed by the processor, cause the processor to implement, for the call, at least one per-outgoing call feature categorized in the per-outgoing call feature module in accordance with the feature implementation architecture,
an omniscient call feature module comprising computer-executable instructions that, when executed by the processor, cause the processor to implement, for the call, at least one omniscient feature categorized in the omniscient call feature module in accordance with the feature implementation architecture,
a multi-device call feature module comprising computer-executable instructions that, when executed by the processor, cause the processor to implement, for the call, at least one multi-device feature categorized in the multi-device call feature module in accordance with the feature implementation architecture,
a first contact call feature module comprising computer-executable instructions that, when executed by the processor, cause the processor to implement, for the call, at least one first contact call feature categorized in the first contact call feature module in accordance with the feature implementation architecture,
a per-outgoing device feature module comprising computer-executable instructions that, when executed by the processor, cause the processor to implement, for the call, at least one per-outgoing device feature categorized in the per-outgoing device feature module in accordance with the feature implementation architecture, and
a per-incoming device feature module comprising computer-executable instructions that, when executed by the processor, cause the processor to implement, for the call, at least one per-incoming device feature categorized in the per-incoming device feature module in accordance with the feature implementation architecture.

19. The feature server computer of claim 18, wherein the memory further comprises instructions stored thereon that, when executed by the processor, cause the processor to:
in response to receiving an initial incoming call request at the per-incoming call feature module, route the initial incoming call request from the per-incoming call feature module to the multi-call call feature module of the feature server computer;
route the initial incoming call request from the multi-call call feature module of the feature server computer to the omniscient call feature module or the per-outgoing call feature module;
if the initial incoming call request is routed to the omniscient call feature module, route the initial incoming call request from the omniscient call feature module to the multi-device call feature module; and
route the initial incoming call request from the multi-device call feature module to the first contact call feature module then to the per-outgoing device feature module or directly to the per-outgoing device feature module.

20. The feature server computer of claim 18, wherein the memory further comprises instructions stored thereon that, when executed by the processor, cause the processor to:
in response to receiving an initial incoming device request at the per-incoming device feature module, route the initial incoming device request from the per-incoming device feature module to the multi-device call feature module;
route the initial incoming device request from the multi-device call feature module to the first contact call feature module then to the per-outgoing device feature module, directly to the per-outgoing device feature module, or to the omniscient call feature module; and
if the initial incoming device request is routed to the omniscient call feature module, route the initial incoming device request from the omniscient call feature module to the multi-call call feature module and then to the per-outgoing call feature module.

* * * * *